Sept. 22, 1931.  C. ORSETT  1,824,096
VEHICLE SUSPENSION
Original Filed Aug. 31, 1928
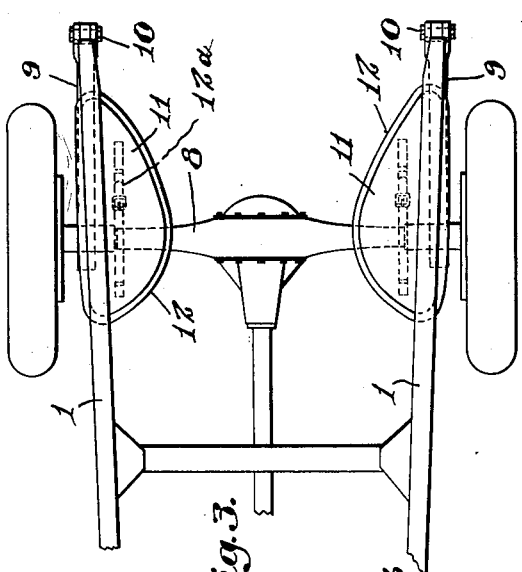
Fig.3.
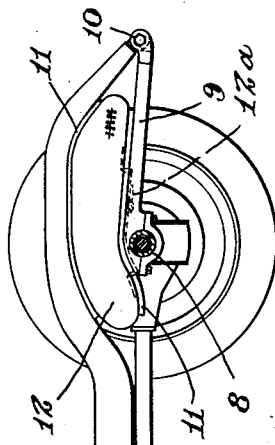
Fig.1.
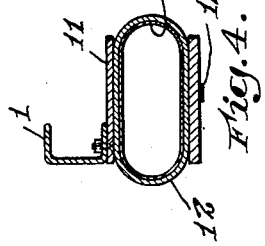
Fig.4.
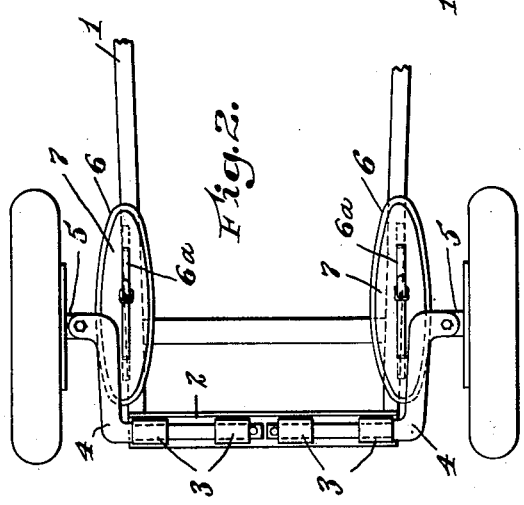
Fig.2.
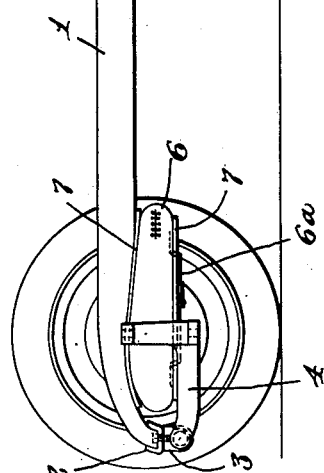
Inventor Patented Sept. 22, 1931

1,824,096

UNITED STATES PATENT OFFICE

COY ORSETT, OF BOSTON, MASSACHUSETTS

VEHICLE SUSPENSION

Application filed August 31, 1928, Serial No. 303,350. Renewed February 13, 1931.

My invention relates to a new type of suspension for vehicles and has for an object the complete departure from the conventional type of spring suspension.

Another object of my invention is to provide an entirely new type of front axle.

Still another object is to provide a new type of drive member for the rear part of the chassis.

In the drawings, wherein like numerals refer to like parts throughout the views:

Figure 1 is a side elevation of the running gear.

Figure 2 is a lower view of the arrangement of the front end of the running gear.

Figure 3 is a rear and top plan view of my principle of suspension.

Figure 4 represents my principle of pneumatic suspension.

In order to obtain the function of the riding part, I form the front axle part of two separate members 4, which members are held in place by suitable bearings 3 on the cross channel frame piece of the front end of the chassis. I obtain the function of the driving part of the rear end of the vehicle by attaching two members 9 to the axle housing. These members are necessary in this invention to perform the drive part of the vehicle.

I now place a pneumatic suspension to function in the place of the conventional leaf spring, see elements 6 and 12. I employ especially made air inflation bags of sufficient strength and resiliency to carry the load according to the requirements, and I place these air bags in between the drive members and the channel frame of the chassis. According to this invention, the arrangement and combination for this type of automobile pneumatic suspension, I affix a crosspiece 2 at the ends of the goose neck, uniting the two ends of the front part of the chassis. On the under side of the cross-piece of the chassis I affix suitable bearings 3 to receive the tubular drive members 4. These right and left drive members are not of one unit but are disconnected at the center of the cross-piece and each has a locking flange to prevent the same from slipping out. These drive members can partly rotate within their bearings, but cannot slip out owing to their flanges.

I now place an under sole or platform 7 at the front drive members, and a similar platform at the side of the chassis frame in order to receive the air bags 6 which are held in place between their platforms by straps, and by the weight of the upper part of the vehicle. It is therefore seen that by the application of these drive members and the pneumatic air bags, I obtain the function of the present steel spring suspension in actual practice at a reduction in weight and improved resiliency. I further obtain greater efficiency in road shock absorption, because since the front drive members are detached from one another in their movement, the impact of an obstruction to one of the wheels has no effect on the other member. The application of this principle of vehicle suspension to the rear end of the vehicle differs from the front end in design of the drive members, but the principle remains the same. I attach by suitable flanges and bearings a rear end drive member 9 of channel steel, light in weight, yet strong enough to function in place of the conventional steel spring leaf set. I attach one end of this drive member to the end part of the channel frame of the chassis by a connection at 10, and the other end of said member to the sleeve of the rear end housing. These drive members perform the function of driving the car, the same function as is now performed by the ordinary steel leaf spring set. I now place by suitable means, a sole 11 or platform on the sleeve of the rear end housing, and a similar platform on the under part of the channel frame of the chassis, and by placing the air bags 12 between these two platforms, I obtain a suspension of this invention.

It must be understood that this new type of pneumatic auto-suspension has the advantage of inflation control from the operator of the car, as by suitable connections air can be compressed into the air bags when more persons are carried and air let out of same when light loads are desired. These inflating and deflating connections can be attached to valves on the air bags and controlled by the operator through a small air compression tank connection; with pressure gauges giving the reading of the air pressure in each of the bags. The advantage of this type of air suspension and drive is that it is not subject to injury such as pneumatic tires are, as these air bags have no other contact but their soles or platforms which are especially affixed and constructed for their reception and functioning.

My invention is further described and defined in the form of claim as follows:

In a vehicle running gear, a chassis frame including longitudinally extending side members connected at their front ends by a cross member, a plurality of transversely arranged bearings on said cross member, two half axles, each half axle consisting of a transversely extending portion and a rearwardly extending portion, said transversely extending portions being mounted in said bearings for pivotal movement independent of each other, a wheel mounted on each rearwardly extending portion, and pneumatic suspension means between each rearwardly extending portion and the chassis frame.

COY ORSETT.